(12) United States Patent
Guo et al.

(10) Patent No.: US 10,231,071 B2
(45) Date of Patent: Mar. 12, 2019

(54) SILICA GEL VIBRATING DIAPHRAGM AND METHOD FOR FABRICATING THE SAME

(71) Applicant: GOERTEK INC., Weifang (CN)

(72) Inventors: Xiaodong Guo, Weifang (CN); Wenhai Wang, Weifang (CN)

(73) Assignee: GOERTEK INC., Weifang (CN)

( * ) Notice: Subject to any disclaimer, the term of this patent is extended or adjusted under 35 U.S.C. 154(b) by 122 days.

(21) Appl. No.: 15/504,649

(22) PCT Filed: Dec. 18, 2015

(86) PCT No.: PCT/CN2015/097960
§ 371 (c)(1),
(2) Date: Feb. 16, 2017

(87) PCT Pub. No.: WO2016/165376
PCT Pub. Date: Oct. 20, 2016

(65) Prior Publication Data
US 2017/0238110 A1    Aug. 17, 2017

(30) Foreign Application Priority Data
Apr. 14, 2015   (CN) .......................... 2015 1 0175913

(51) Int. Cl.
*H04R 31/00* (2006.01)
*B29C 43/58* (2006.01)
(Continued)

(52) U.S. Cl.
CPC ......... *H04R 31/003* (2013.01); *B29C 43/245* (2013.01); *B29C 43/30* (2013.01);
(Continued)

(58) Field of Classification Search
CPC ....... B29C 43/30; B29C 43/58; B29C 43/245; H04R 7/06; H04R 7/10; H04R 7/18; B29K 2105/0061; B29L 2031/38
See application file for complete search history.

(56) References Cited

U.S. PATENT DOCUMENTS 4,377,617 A    3/1983   Ikei et al.
9,173,033 B1 * 10/2015  Lin .......................... H04R 7/125
(Continued)

FOREIGN PATENT DOCUMENTS

| CN | 202713585 U | 1/2013 |
| CN | 103052017 A | 4/2013 |

(Continued)

OTHER PUBLICATIONS

International Search Report and Written Opinion dated Mar. 15, 2016 for PCT Application No. PCT/CN2015/097960.
(Continued)

*Primary Examiner* — Nahida Sultana
(74) *Attorney, Agent, or Firm* — Moser Taboada

(57) ABSTRACT

The present disclosure discloses a silica gel vibrating diaphragm and a method for fabricating the same. The method comprises: forming a composite material belt by using two layers of a base material and liquid silica gel in a calendering manner, wherein the liquid silica gel is between the two layers of the base material; wholly hot-press molding the composite material belt by a vibrating diaphragm die holder, a temperature of the hot-press molding being higher than a vulcanization temperature of the liquid silica gel; removing the two layers of the base material to obtain a whole sheet of silica gel vibrating diaphragm; and blanking the whole sheet of silica gel vibrating diaphragm that has been removed of the two layers of the base material to fabricate a required silica gel vibrating diaphragm. As compared with conventional solutions, the technical solution of the present
(Continued)

disclosure has the advantages of simple molding manner, low cost, various styles of the vibrating diaphragm, and small thickness of the vibrating diaphragm.

5 Claims, 4 Drawing Sheets

(51) Int. Cl.
*B29C 43/30* (2006.01)
*H04R 7/06* (2006.01)
*B29C 43/24* (2006.01)
B29K 105/00 (2006.01)
B29L 31/38 (2006.01)
H04R 7/10 (2006.01)
H04R 7/18 (2006.01)

(52) U.S. Cl.
CPC .............. *B29C 43/58* (2013.01); *H04R 7/06* (2013.01); *B29K 2105/0061* (2013.01); *B29L 2031/38* (2013.01); *H04R 7/10* (2013.01); *H04R 7/18* (2013.01); *H04R 2307/023* (2013.01); *H04R 2307/025* (2013.01)

(56) References Cited

U.S. PATENT DOCUMENTS

| 9,820,068 | B2* | 11/2017 | Zhang | H04R 29/003 |
| 2018/0041838 | A1* | 2/2018 | Chang | H04R 7/16 |
| 2018/0160246 | A1* | 6/2018 | Zhu | H04R 31/003 |

FOREIGN PATENT DOCUMENTS

| CN | 103909701 A | 7/2014 |
| CN | 203747985 U | 7/2014 |
| CN | 203933955 U | 11/2014 |
| CN | 104853303 A | 8/2015 |
| CN | 204836551 U | 12/2015 |
| JP | S56109097 A | 8/1981 |
| JP | 2005184768 A | 7/2005 |
| KR | 101002508 B1 | 12/2010 |

OTHER PUBLICATIONS

Chinese Office Action dated Jul. 18, 2017 for Application No. 201510175913.1.
Extended European Search Report dated Jul. 31, 2018 for Application No. 15889072.3.

* cited by examiner

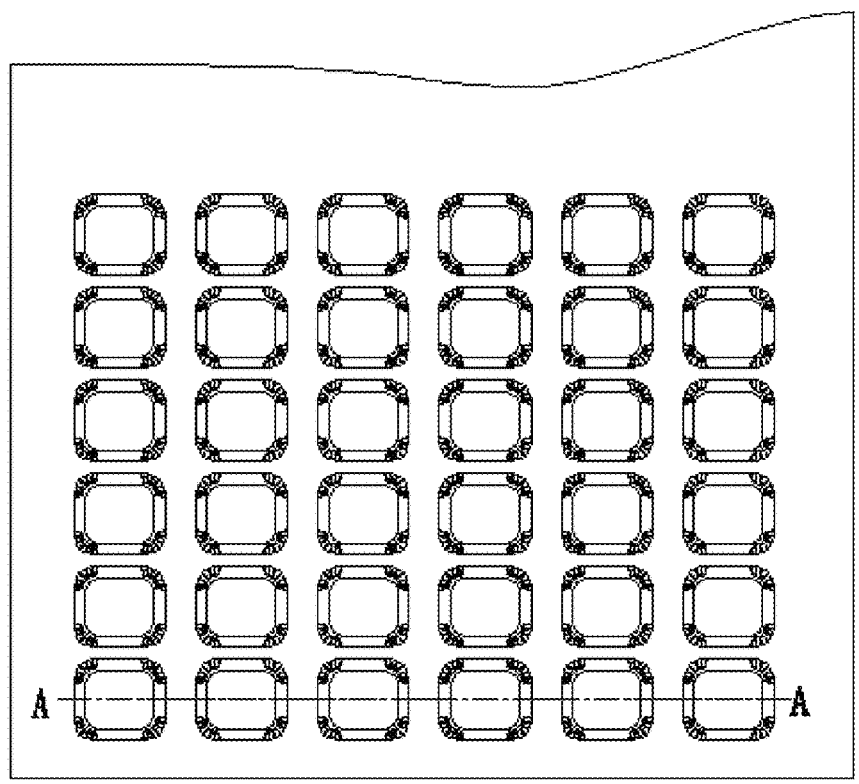
Fig. 3-a
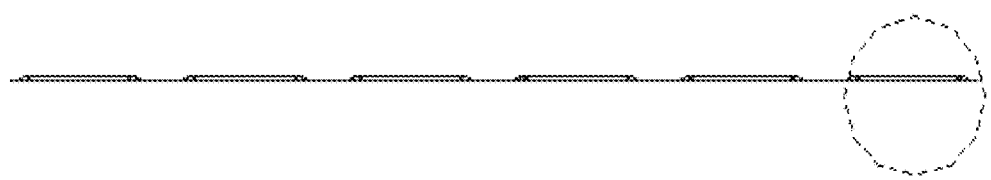
Fig. 3-b
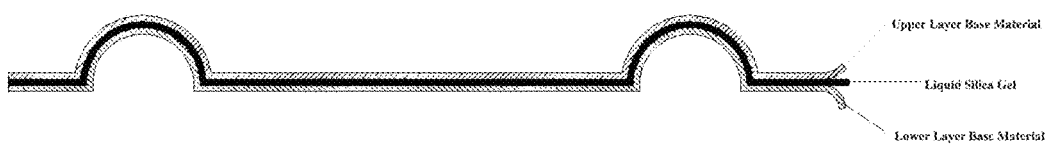
Fig. 4-a

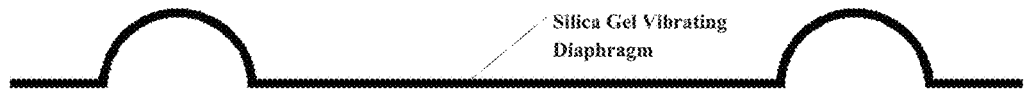
Fig. 4-b
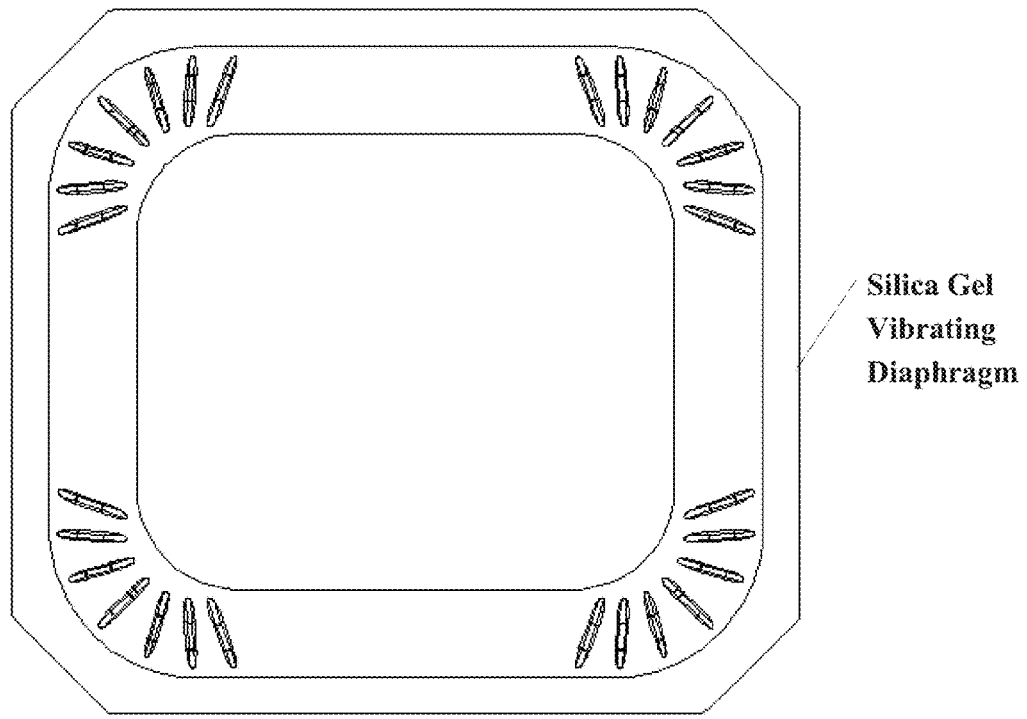
Fig. 5

SILICA GEL VIBRATING DIAPHRAGM AND METHOD FOR FABRICATING THE SAME

TECHNICAL FIELD

The present disclosure relates to the technical field of electronic products, and particularly, to a silica gel vibrating diaphragm and a method for fabricating the same.

BACKGROUND

Currently, silica gel vibrating diaphragms are usually injection molded. However, this molding mode has a high cost and a low efficiency, and the vibrating diaphragm is thick (usually more than 50 μm) due to the limitation of the injection molding conditions. In addition, the mold adjustment is complex in the injection molding process, which is adverse to quick product development.

SUMMARY

In view of the above problem, the present disclosure is proposed to provide a silica gel vibrating diaphragm and a method for fabricating the same, which can overcome or at least partially solve the above problem. The technical solutions of the present disclosure are realized as follows:

In one aspect, an embodiment of the present disclosure provides a method for fabricating a silica gel vibrating diaphragm, comprising:

forming a composite material belt by using two layers of a base material and liquid silica gel in a calendering manner, wherein the liquid silica gel is between the two layers of the base material;

wholly hot-press molding the composite material belt by a vibrating diaphragm die holder, a temperature of the hot-press molding being higher than a vulcanization temperature of the liquid silica gel;

removing the two layers of the base material to obtain a whole sheet of silica gel vibrating diaphragm; and blanking the whole sheet of silica gel vibrating diaphragm that has been removed of the two layers of the base material to fabricate a required silica gel vibrating diaphragm.

Preferably, the forming a composite material belt by using two layers of a base material and liquid silica gel in a calendering manner comprises:

placing one layer of the base material at a bottom layer to serve as a lower layer base material, and coating the liquid silica gel onto the lower layer base material by a glue applicator;

adjusting a thickness of the liquid silica gel by a thickness control device, and laying the other layer of the base material on the liquid silica gel to serve as an upper layer base material; and performing pressure maintaining processing for the lower layer base material, the liquid silica gel and the upper layer base material by a pressure maintaining shaft to obtain the composite material belt.

Preferably, the method comprises during the coating the liquid silica gel onto the lower layer base material by a glue applicator, reserving a gap not coated with the liquid silica gel at an edge of the lower layer base material; and after the adjusting a thickness of the liquid silica gel by a thickness control device, when laying the other layer of the base material on the liquid silica gel to serve as the upper layer base material, aligning an edge of the upper layer base material with the edge of the lower layer base material.

Preferably, the liquid silica gel is made by sufficiently mixing two silica gel preparing solutions in proportion.

Preferably, the two layers of the base material are one or two of polyetheretherketone (PEEK), polyethylene terephthalate (PET), polyetherimide (PEI), and thermoplastic polyurethanes (TPU).

In another aspect, an embodiment of the present disclosure provides a silica gel vibrating diaphragm, fabricated by:

forming a composite material belt by using two layers of a base material and liquid silica gel in a calendering manner, wherein the liquid silica gel is between the two layers of the base material;

wholly hot-press molding the composite material belt by a vibrating diaphragm die holder, a temperature of the hot-press molding being higher than a vulcanization temperature of the liquid silica gel;

removing the two layers of the base material to obtain a whole sheet of silica gel vibrating diaphragm; and blanking the whole sheet of silica gel vibrating diaphragm that has been removed of the two layers of the base material to fabricate a required silica gel vibrating diaphragm.

Preferably, the composite material belt is fabricated by:

placing one layer of the base material at a bottom layer to serve as a lower layer base material, and coating the liquid silica gel onto the lower layer base material by a glue applicator;

adjusting a thickness of the liquid silica gel by a thickness control device, and laying the other layer of the base material on the liquid silica gel to serve as an upper layer base material; and performing pressure maintaining processing for the lower layer base material, the liquid silica gel and the upper layer base material by a pressure maintaining shaft to obtain the composite material belt.

Preferably, a gap not coated with the liquid silica gel is reserved at an edge of the lower layer base material and an edge of the upper layer base material.

Preferably, the liquid silica gel for fabricating the silica gel vibrating diaphragm is made by sufficiently mixing two silica gel preparing solutions in proportion.

Preferably, the two layers of the base material for fabricating the silica gel vibrating diaphragm are one or two of polyetheretherketone (PEEK), polyethylene terephthalate (PET), polyetherimide (PEI), and thermoplastic polyurethanes (TPU).

The embodiments of the present disclosure have the following beneficial effects: the present disclosure discloses a silica gel vibrating diaphragm and a method for fabricating the same. The method performs a material bet composition for two layers of a base material and liquid silica gel in a calendaring manner, molds the obtained composite material belt in a hot-press molding manner, removes the upper layer base material and the lower layer base material after the molding, and blanks the whole sheet of silica gel vibrating diaphragm that has been removed of the base material, thereby fabricating the required silica gel vibrating diaphragm. As compared with conventional technical solutions, this technical solution has the advantages of simple molding manner, and controllable thickness of the vibrating diaphragm (the minimum thickness is 5 μm). In addition, in this technical solution, since the vibrating diaphragm die holder used in the molding process has a lower cost and more styles than the injection die used in conventional technical solutions, this technical solution further has the advantages of low cost and various styles of the vibrating diaphragm.

The above descriptions are just generalizations of the technical solutions of the present disclosure, and in order to understand the technical means of the present disclosure more clearly, the specific embodiments of the present disclosure are illustrated as follows.

BRIEF DESCRIPTION OF THE DRAWINGS

The drawings are provided for a further understanding of the present disclosure, and constitute part of the Specification. The drawings are used together with the embodiments of the present disclosure to explain the present disclosure, rather than making any limitation to the present disclosure. In the drawings.

FIG. 3-a is a schematic diagram of a whole sheet of composite material belt after hot-press molding provided by an embodiment of the present disclosure;

FIG. 3-b is a side view of a composite material belt after hot-press molding along a section line A-A provided by an embodiment of the present disclosure;

FIG. 4-a is a schematic diagram of part of a vulcanized composite material belt provided by an embodiment of the present disclosure;

FIG. 4-b is a schematic diagram of a silica gel vibrating diaphragm that has been removed of base material provided by an embodiment of the present disclosure;

FIG. 5 is a schematic diagram of a blanked silica gel vibrating diaphragm provided by an embodiment of the present disclosure;

DETAILED DESCRIPTION

In order that the objectives, technical solutions and advantages of the present disclosure are clearer, the embodiments of the present disclosure will be further described in details as follows with reference to the drawings.

Figure 1:
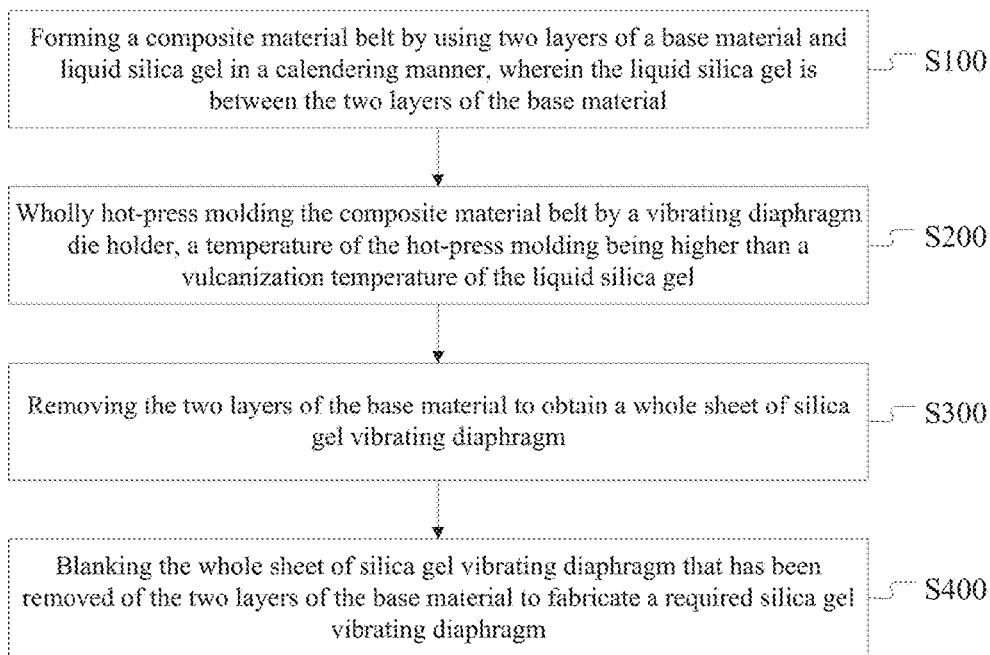
FIG. 1 is a flow diagram of a method for fabricating a silica gel vibrating diaphragm provided by an embodiment of the present disclosure.

FIG. 1 is a flow diagram of a method for fabricating a silica gel vibrating diaphragm provided by an embodiment of the present disclosure. The method comprises:

S100: forming a composite material belt by using two layers of a base material and liquid silica gel in a calendering manner, wherein the liquid silica gel is between the two layers of the base material.

Figure 2:
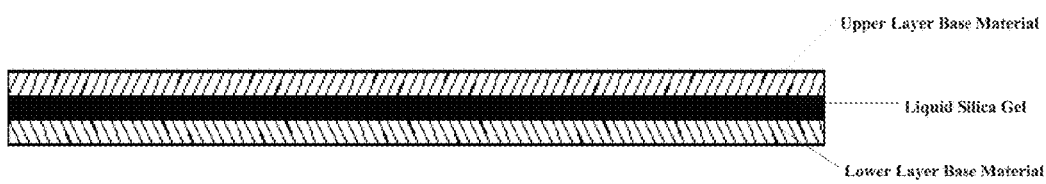
FIG. 2 is a schematic diagram of a composite material belt fabricated in a calendering manner provided by an embodiment of the present disclosure.

As illustrated in FIG. 2, FIG. 2 is a schematic diagram of a composite material belt fabricated in a calendering manner provided by an embodiment of the present disclosure, and the liquid silica gel in FIG. 2 is between an upper layer base material and a lower layer base material.

In that, the calendering is a process of fabricating a semi-finished product such as a glue sheet by putting a heated rubber compound through the gap between two rollers arranged horizontally and rotated relative to each other.

S200: wholly hot-press molding the composite material belt by a vibrating diaphragm die holder, a temperature of the hot-press molding being higher than a vulcanization temperature of the liquid silica gel.

As illustrated in FIGS. 3-a and 3-b, FIGS. 3-a and 3-b are schematic diagrams of a composite material belt after hot-press molding provided by an embodiment of the present disclosure.

In this step, the liquid silica gel is vulcanization molded in a manner of hot-press molding, wherein the number of the vibrating diaphragm die holders may be adjusted according to the area and molding state of the composite material belt. In practical applications, the vibrating diaphragm die holder in this step may be single or plural.

Since the vibrating diaphragm die holder has a lower cost than injection dies, this technical solution molds the composite material belt with the vibrating diaphragm die holder, which does not only reduces the production cost, but also conveniently obtains vibrating diaphragms of various shapes.

S300: removing the two layers of the base material to obtain a whole sheet of silica gel vibrating diaphragm.

As illustrated in FIGS. 4-a and 4-b, FIGS. 4-a and 4-b are schematic diagrams of part of the vulcanized composite material belt and the silica gel vibrating diaphragm that has been removed of base material, respectively.

By employing the incompatibility between the vulcanized silica gel and the base material, this step successfully gets rid of the two layers of the base material, and obtains an undamaged and whole sheet of silica gel vibrating diaphragm.

S400: blanking the whole sheet of silica gel vibrating diaphragm that has been removed of the two layers of the base material to fabricate a required silica gel vibrating diaphragm.

As illustrated in FIG. 5, FIG. 5 is a schematic diagram of a blanked silica gel vibrating diaphragm provided by an embodiment of the present disclosure.

As compared with the conventional injection molded silica gel vibrating diaphragm, the silica gel vibrating diaphragm obtained in the method of the embodiment has the advantages of simple molding manner, low cost, various styles of the vibrating diaphragm, and small thickness of the vibrating diaphragm.

Next, a specific embodiment will be provided to in detail describe how to apply the conventional calendering process into the fabrication of the vibrating diaphragm.

Figure 6:
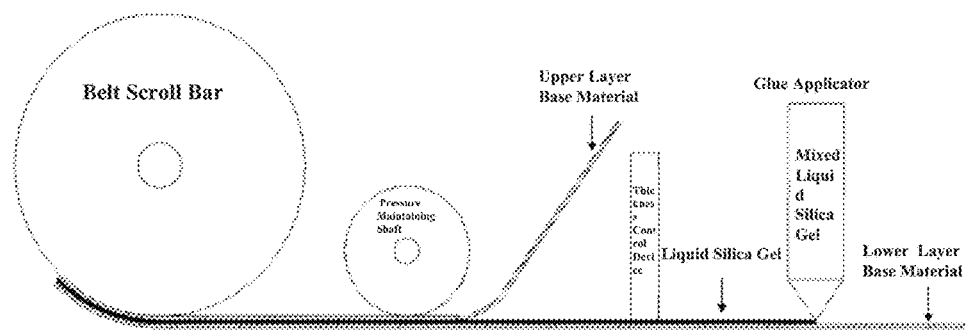
FIG. 6 is a schematic diagram of fabricating a composite material belt in a calendering manner provided by an embodiment of the present disclosure.

As illustrated in FIG. 6, FIG. 6 is a schematic diagram of fabricating a composite material belt in a calendering manner provided by an embodiment of the present disclosure, and specifically, the following manner is adopted to fabricate the composite material belt:

placing one layer of the base material at a bottom layer to serve as a lower layer base material, and coating the liquid silica gel onto the lower layer base material by a glue applicator;

during the coating the liquid silica gel onto the lower layer base material, the thickness of the liquid silica gel may be non-uniform, and the coating thickness may not coincide with the required thickness of the liquid silica gel; thus, this technical solution adjusts the thickness of the liquid silica gel by a thickness control device to solve the problem that the thickness of the liquid silica gel cannot be accurately controlled during coating the liquid silica gel;

while the thickness control device is adjusting the thickness of the liquid silica gel, laying the other layer of the base material on the liquid silica gel to serve as an upper layer base material; and performing pressure maintaining processing for the lower layer base material, the liquid silica gel and the upper layer base material by a pressure maintaining shaft to obtain the composite material belt.

In practical applications, the obtained composite material belt may be calendered up through a belt scroll bar for the convenience of the storage of the composite material belt.

In this embodiment, in order to conveniently remove the upper layer base material and the lower layer base material, and sufficiently utilize all the liquid silica gel, the liquid silica gel is received between the two layers of the base material when the material belt composition is made for the two layers of the base material and the liquid silica gel.

Figure 7:
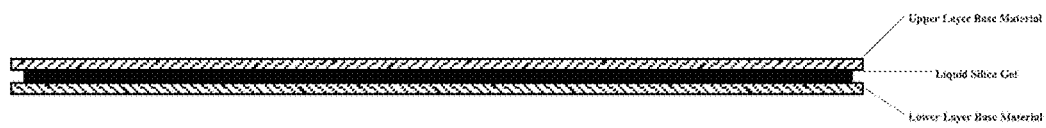
FIG. 7 is a schematic diagram of a composite material belt having liquid silica gel received between two layers of a base material provided by an embodiment of the present disclosure.

As illustrated in FIG. 7, FIG. 7 is a schematic diagram of a composite material belt having liquid silica gel received between two layers of a base material provided by an embodiment of the present disclosure. The method comprises during the coating the liquid silica gel onto the lower layer base material by a glue applicator, reserving a gap not coated with the liquid silica gel at the edge of the lower layer base material; and after the adjusting a thickness of the liquid silica gel by a thickness control device, when laying the other layer of the base material on the liquid silica gel to serve as the upper layer base material, aligning an edge of the upper layer base material with the edge of the lower layer base material.

To be noted, the liquid silica gel in this technical solution is made by sufficiently mixing two silica gel preparing solutions in proportion.

Figure 8:
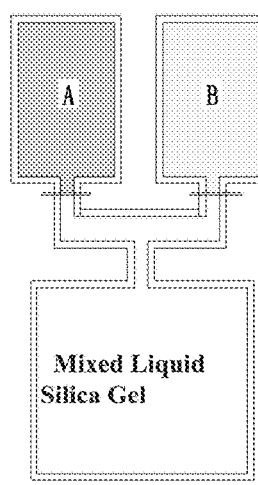
FIG. 8 is a schematic diagram of preparing liquid silica gel.

As illustrated in FIG. 8, FIG. 8 is a schematic diagram of preparing liquid silica gel, wherein two silica gel preparing solutions are put in two separate containers and sufficiently mixed in a preset proportion, so as to obtain the required liquid silica gel.

To be further noted, the two layers of the base material in this technical solution may be one or two of polyetheretherketone (PEEK), polyethylene terephthalate (PET), polyetherimide (PEI), and thermoplastic polyurethanes (TPU).

In that, polyetheretherketone (PEEK) is a linear aromatic high molecular compound with its molecular backbone containing chain links, and it is semicrystalline thermoplastic special engineering plastic. As compared with other special engineering plastics, it has the advantages such as a temperature resistance of 260° C., excellent mechanical property, good self-lubricating property, chemical resistance, flame retardance, delamination resistance, heat resistance, non-resistance to strong nitric acid and concentrated sulphuric acid, radiation resistance, and ultra-strong mechanical property.

Polyethylene terephthalate (PET) is a milky white or pale yellow and high-crystalline polymer, with its surface smooth and glossy. It has excellent physical and mechanical properties within a wide temperature range. The long-term usage temperature reaches 120° C., the electrical insulation is excellent and the electrical property is still good even under high temperature and high frequency, the creep resistance, fatigue resistance, rub resistance and dimensional stability are all fine, and only the corona resistance is poor.

Polyetherimide (PEI) is an amber transparent solid. It has very strong high-temperature stability, and even a non-enhanced PEI still has good toughness and strength. Due to the superior thermal stability, PEI may be used to make high temperature heat resistant devices. Further, PEI has excellent mechanical property, electrical insulation property, radiation resistant property, and high and low temperatures and wear resistant properties, and can be passed by microwaves. PEI also has favorable characteristics of flame retardance, chemical reaction resistance and electric insulation. In addition, PEI may also form a heat-resistant high-molecular alloy together with other engineering plastics, and may be used for a long term under the operating temperature of −160~180° C.

Thermoplastic polyurethanes (TPU) are mainly classified into a polyester type and a polyether type. TPU has the advantages such as wide hardness range, high mechanical strength, strong cold endurance, good processability, oil resistance, water resistance and mycete resistance. It is widely used in the fields of commodities, sports goods, toys, decorative materials, etc.

Based on the same technical conception as the method for fabricating a silica gel vibrating diaphragm, the present disclosure further provides a silica gel vibrating diaphragm, which is fabricated by:

forming a composite material belt by using two layers of a base material and liquid silica gel in a calendering manner, wherein the liquid silica gel is between the two layers of the base material;

wholly hot-press molding the composite material belt by a vibrating diaphragm die holder, a temperature of the hot-press molding being higher than a vulcanization temperature of the liquid silica gel;

removing the two layers of the base material to obtain a whole sheet of silica gel vibrating diaphragm; and blanking the whole sheet of silica gel vibrating diaphragm that has been removed of the two layers of the base material to fabricate a required silica gel vibrating diaphragm.

The composite material belt is formed by:

placing one layer of the base material at a bottom layer to serve as a lower layer base material, and coating the liquid silica gel onto the lower layer base material by a glue applicator;

adjusting a thickness of the liquid silica gel by a thickness control device, and laying the other layer of the base material on the liquid silica gel to serve as an upper layer base material; and performing pressure maintaining processing for the lower layer base material, the liquid silica gel and the upper layer base material by a pressure maintaining shaft to obtain the composite material belt.

Preferably, a gap not coated with the liquid silica gel is reserved at the edges of the lower layer base material and the upper layer base material.

To be noted, the liquid silica gel in this embodiment is made by sufficiently mixing two silica gel preparing solutions in proportion.

For example, two silica gel preparing solutions are put in two separate containers, and sufficiently mixed in a preset proportion, so as to obtain the required liquid silica gel.

To be further noted, the two layers of the base material in this technical solution may be one or two of polyetheretherketone (PEEK), polyethylene terephthalate (PET), polyetherimide (PEI), and thermoplastic polyurethanes (TPU).

In conclusion, the present disclosure discloses a silica gel vibrating diaphragm and a method for fabricating the same. The method performs a material bet composition for two layers of a base material and liquid silica gel in a calendering manner, molds the obtained composite material belt in a hot-press molding manner, removes the upper layer base material and the lower layer base material after the molding, and blanks the whole sheet of silica gel vibrating diaphragm that has been removed of the base material, thereby fabricating the required silica gel vibrating diaphragm. As compared with conventional technical solutions, this technical solution has the advantages of simple molding manner, and controllable thickness of the vibrating diaphragm (the minimum thickness is 5 μm). In addition, in this technical solution, since the vibrating diaphragm die holder used in the molding process has a lower cost and more styles than the injection die used in conventional technical solutions, this technical solution further has the advantages of low cost and various styles of the vibrating diaphragm.

The above descriptions are just preferred embodiments of the present disclosure, rather than limitations to the protection scope of the present disclosure. Any amendment, equivalent replacement, improvement, etc. made within the spirit and principle of the present disclosure shall fall within the protection scope of the present disclosure.

The invention claimed is:

1. A method for fabricating a silica gel vibrating diaphragm, comprising:
    forming a composite material belt by using two layers of a base material and liquid silica gel in a calendering manner, wherein the liquid silica gel is between the two layers of the base material;
    wholly hot-press molding the composite material belt by a vibrating diaphragm die holder, a temperature of the hot-press molding being higher than a vulcanization temperature of the liquid silica gel;
    removing the two layers of the base material to obtain a whole sheet of silica gel vibrating diaphragm; and
    blanking the whole sheet of silica gel vibrating diaphragm that has been removed of the two layers of the base material to fabricate a required silica gel vibrating diaphragm.

2. The method according to claim 1, wherein the forming a composite material belt by using two layers of a base material and liquid silica gel in a calendering manner comprises:
    placing one layer of the base material at a bottom layer to serve as a lower layer base material, and coating the liquid silica gel onto the lower layer base material by a glue applicator;
    adjusting a thickness of the liquid silica gel by a thickness control device, and laying the other layer of the base material on the liquid silica gel to serve as an upper layer base material; and
    performing pressure maintaining processing for the lower layer base material, the liquid silica gel and the upper layer base material by a pressure maintaining shaft to obtain the composite material belt.

3. The method according to claim 2, wherein the method comprises during the coating the liquid silica gel onto the lower layer base material by the glue applicator, reserving a gap not coated with the liquid silica gel at an edge of the lower layer base material; and
    after the adjusting a thickness of the liquid silica gel by the thickness control device, when laying the other layer of the base material on the liquid silica gel to serve as the upper layer base material, aligning an edge of the upper layer base material with the edge of the lower layer base material.

4. The method according to claim 3, wherein the liquid silica gel is made by sufficiently mixing two silica gel preparing solutions in proportion.

5. The method according to claim 4, wherein the two layers of the base material are one or two of polyetheretherketone (PEEK), polyethylene terephthalate (PET), polyetherimide (PEI), and thermoplastic polyurethanes (TPU).

* * * * *